MAGNETIC TAPE SPACER WITH COMPUTER UNIT

Filed July 6, 1962

INVENTOR.
CARL THUMIM
BY
OSTROLENK, FABER, GERB & SOFFEN
ATTORNEYS

United States Patent Office 3,229,127

Patented Jan. 11, 1966

3,229,127

MAGNETIC TAPE SPACER WITH COMPUTER UNIT

Carl Thumim, Lombard, Ill., assignor to Miehle-Goss-Dexter, Inc., Chicago, Ill., a corporation of Delaware
Filed July 6, 1962, Ser. No. 208,059
16 Claims. (Cl. 307—149)

This invention relates to magnetic tape programming and particularly to programming of the movement of the back gauge of a guillotine type paper cutting machine having provision for slow and fast back gauge drive via control of respective clutches for such speeds.

A guillotine type paper cutter comprises a vertically reciprocating knife blade for cutting through a pile of paper sheets and a back gauge controlledly moving the paper pile into position under the knife in a sequential manner so that sections of the pile are cut off in desired lengths. Various systems for automatically moving and stopping the back gauge in accordance with the desired sequence of length of cuts have heretofore been proposed and are in use. A magnetic tape control system forms the basis of the present invention, of the type wherein a tape travels at the speed of the back gauge or is synchronized therewith, in a manner well known in the art, e.g., as shown in the patent to Hribar 2,992,578, and others.

In order to control the back gauge accurately so that it will push the paper pile an exact amount without any over-travel, considerable precision is required in the system comprising the programming record and the read-out therefor, as well as the mechanical components which power and stop the back gauge. The attainment of such precision is achieved by controls such that the back gauge is first slowed down from a normal fast speed by a magnetic tape signal passing a pickup head, followed by passing a second head which effects stopping of the gauge. In one system, for which the present invention constitutes an improvement, the signals are on a single track tape, and a pair of predeterminedly spaced magnetic pickup heads are provided. One head, upstream of the direction of movement of the tape, is the so-called slow head, the other being the so-called stop head and located downstream. The heads are thus aligned in the direction of the movement of the tape, and each controls suitable circuitry, brakes, clutches, etc., to perform their respective functions of slowing the back gauge just prior to stopping it. Arrangements of this type as presently used, require a predetermined minimum distance or spacing between the two heads so that the back gauge can be put in low speed from high speed to make certain that there will be no over-travel of back gauge movement when the signal reaches the stop head downstream of the slow head.

One type of cut which is made on such a machine, is a so-called trim-out; this is a cut where a very short section of the pile is severed, measured in small fractions of an inch, and the signals on the tape are thus very close together. The predetermined spacing of the heads causes a difficulty in that when trim-out signals are placed closer together than the head spacing, the first signal will be sensed by the slow head but by the time it reaches the stop head downstream, a closely following signal will have already passed the slow head and fail to register since the first signal has already conditioned the circuitry for its own specific cut. The control circuitry being conditioned by the first signal to stop the gauge, the gauge starting speed thereafter is slow in conventional practice for the full spacing distance between the heads. This mode of operation causes considerable loss of time with conventional machines due to the need for the gauge to traverse such spacing between heads at the end of each cut, because of the possibility that such cut may be followed by a short trim out cut, the signal for which has already passed the slow head without being sensed. To restate the problem, if the gauge were to start immediately in fast speed after a cut and the next cut were a trim out, the gauge would have to come to a stop without a slow down period, and the moving mechanical masses involved would effect over-travel of the desired cut line; to prevent such inaccuracy in conventional systems each time the gauge is put in motion it starts in slow speed and remains in such speed for a predetermined distance going into fast speed unless the heads receive another signal during the slow speed interval. This represents lost time where a series of long cuts are to be taken, there being no need for a slow speed interval after each such cut.

A particular improvement brought about by the present invention relates to increase of efficiency, that is an increase of production of the machine by reducing the so-called slow time, namely, time during which the back gauge is moving slowly before coming to a stop, to a bare minimum by starting the gauge at fast speed following each cut unless a slow speed is specifically required.

Accordingly, the primary object of the invention is to provide a programming system having a minimum amount of time during which the back gauge is moving slowly. Another object is to provide such a system with means to prevent over-travel of the back gauge. An additional object is to provide a system wherein there is no likelihood of interference or confusion in slow and stop signals which might cause the back gauge to run fast or slow at an unintended time.

Other objects and features of the invention will be apparent as the description is developed hereinbelow.

Briefly, the invention comprises conventional tape programming means with attendant control circuitry, all as generally heretofore used for the described purpose, with the addition of a computer actuated in response to stop and slow signals for the purpose of insuring that each slow signal is properly picked off and the control circuitry of back gauge movement made responsive thereto for each cut taken by the knife. Thus, if the signals are very close together for a trim out cut, the system will function normally as heretofore with the gauge moving slowly through the predetermined traverse before stopping. However, each time a cut is made, the back gauge goes into fast speed unless the slow head has received a speed signal which is fed into the computer. Each slow head signal pick-up in turn is fed to the computer, and each such signal in turn is cancelled when the corresponding cut is made as such signal passes the stop head. Accordingly, as long as there is a slow signal in the computer, the back gauge moves slowly. However, the back gauge maintains fast speed except when the signals are very close together as for trim-outs, slowing down only prior to a cut for the distance D and avoiding the predetermined slow speed starting traverse required in present systems, by virtue of the functioning of the computing unit, except when one or more uncancelled slow signals are in the computer.

A detailed description of the invention now follows, in conjunction with the appended drawing, in which.

Figures 1, 2, 3, 4, 4A, 5, 6, 7:
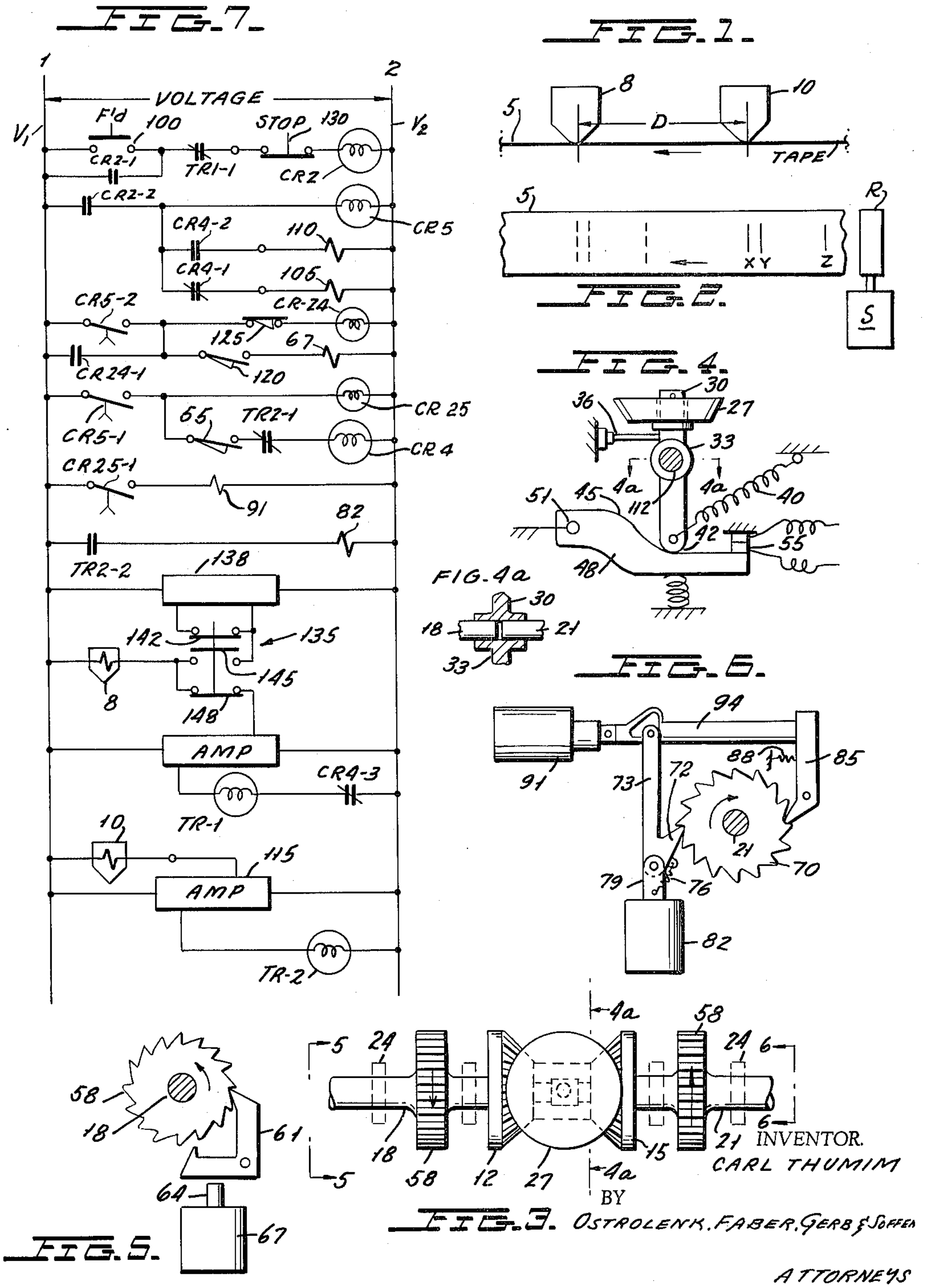
FIGURE 1 is an elevation showing the relationship of the slow and stop heads and the magnetic tape.
FIGURE 2 is a plan view of the tape showing signal location thereon.
FIGURE 3 is a view of a portion of the computer assembly comprising a differential gear arrangement.
FIGURE 4 is a fragmentary section of certain components of the computer taken on 4—4 of FIGURE 3.

FIGURE 4*a* is a view through 4*a*—4*a* of FIGURE 4;

FIGURE 5 is a section of other components of the computer taken 5—5 of FIGURE 3;

FIGURE 6 is a fragmentary section of still other components of the computer taken on 6—6 of FIGURE 3; and, FIGURE 7 is a schematic electrical diagram of the circuitry used in conjunction with the computer arrangement.

Referring to FIGURES 1 and 2 of the drawing, a record member such as magnetic tape 5 is illustrated having a pair of pick-up heads 8 and 10 adjacent thereto, the head 8 being a stop head and the head 10 a slow head. A drive roller R and synchronizing drive S are symbolically illustrated in FIG. 2, which will be understood to drive the tape at a speed synchronized with a machine member to be controlled, in a well known manner. The heads are spaced by the distance D, as shown. The tape carries signals designated as X, Y and Z. Thus, it will be understood that the direction of travel of tape as shown by the arrows, causes the signal X to first pass under the head 10 which effects a slowing of the back gauge (not shown), by virtue of control circuitry shown in FIGURE 7, to be later described. Subsequently, the signal X reaches the stop head 8 and the back gauge then stops, at which time a cut is made by the descending knife, not shown. The mode of control of the knife does not form part of the present invention and accordingly, no description thereof need be given here, save to say that such control methods are well known and conventional. The effect of the signals Y and Z is the same as that disclosed herein above, each such signal effecting a slowing of the back gauge followed by stopping. It will be noted, however, that the separation of the signals is substantially less than the spacing D. The spacing D is predetermined to permit effective slowing of the back gauge and its moving components prior to any signal reaching the stop head so as to prevent over-travel of the paper pile beyond the desired cut line. Accordingly, in conventional machines after any cut is taken the back gauge is moved to slow speed for the distance X or that distance corresponding in back gauge travel to the distance D on the tape, to take care of the possibility that the next signal may be as closely behind X as Y is shown, or by way of further example, as Z is shown behind Y. Should the programming be such that the signal X is not followed for a distance D by any other signal, such conventional systems have means for putting the back gauge into high speed but the slow speed time for the distance D is wasted.

In order to eliminate such waste, the present invention provides a computing unit as shown in FIGURES 3 through 6, and which comprises a differential gear arrangement having pinions 12 and 15 mounted on respective coaxial shafts 18 and 21 suitably supported in bearings such as 24. Intermediate the pinions is a planetary gear 27 mounted on a shaft 30 and rotative with respect thereto. The shaft 30 is provided with a bearing 33 (see FIGURE 4*a*) having an axis transverse to and intersecting the axis of the shaft and in which bearing are rotatively supported the ends of shafts 18 and 21. Thus, the gear 27 is supported between the pinions and it will be apparent that rotation of either pinions will cause planet motion of gear 27 about the axis of the coaxial shafts 18 and 21. In other words, as viewed in FIGURE 3, the gear 27 can move upwardly or downwardly in a curved path about the axis of shafts 18 and 21. As seen in FIGURE 4, the gear 27 has a normal central position against a fixed stop pin 36 maintained by a tension spring 40. The lower end 42 of shaft 30 is cam shaped to coact with a follower surface 45 of a lever 48 pivoted at 51. Accordingly, it will be clear that motion of gear 27 clockwise as viewed on FIGURE 4, will depress lever 48 to open a pair of contacts 55 for a purpose to be hereinafter disclosed.

Shaft 18 carries a ratchet wheel 58, as seen in FIGURE 5, which is keyed to the shaft, and which wheel can be stepped by a double pawl 61 in the direction indicated by the arrow pursuant to actuation by a plunger 64 of a solenoid 67.

Similarly, the shaft 21 carries a ratchet wheel 70 keyed thereto which can be stepped by a pawl lever 72 in the direction indicated by the arrow. The lever is maintained in engagement with the wheel by a spring 76 and upon actuation of plunger 79 by solenoid 82, which plunger is pivoted to lever 73, the wheel is stepped.

An additional pawl lever 85 is biased by spring 88 into engagement with wheel 70. Both pawl levers are subject to actuation by a solenoid 91 acting through plunger 94 to effect release of wheel 70 so that the spring 40 can bring the gear 27 back to central position shown in FIGURES 3 and 4.

The purpose of the solenoid 82 and its immediately coacting components, is to stone, i.e., add signals from the slow head 10 to the computing unit and thus cause cam 42 to effect separation of contacts 55. The purpose of solenoid 67 and its immediately coacting components, is to cancel, i.e., signals stored by reversing the planetary direction of gear 27 each time a cut is made in a paper pile. Thus, solenoid 82 and its coacting components may be referred to as an adding or storing unit, while solenoid 67 and its components may be referred to as a cancelling or subtracting unit. Similarly, solenoid 91 and its coacting components may be referred to as a release unit.

Suitable circuitry is provided so that each time a signal such as X passes the slow head 10, a pulse to the solenoid 82 is effected which moves the plunger 79 against the bias of spring 76 to actuate pawl lever 73 upwardly and thereby stepping or rotating pawl wheel 70 to the extent of one notch. The pawl lever 85, of course, at this time acts as an escapement and does not impede rotation of wheel 70 for clockwise movement in the direction of the arrow shown in FIGURE 6. It will thus be apparent that each time wheel 70 is stepped the cam 42 rides higher on the cam surface 45 and maintains contacts 55 open. Accordingly, just so long as signals X, Y and Z have been detected by slow head 10 and stored in the computer as manifested by movement of cam 42 in successive equal increments, contacts 55 must remain open and cannot close until planet gear 27 is brought back to neutral position, the position shown in FIGURES 3 and 4, where at the cam 42 is once again in position to permit closure of contacts 55. As will be described in connection with FIGURE 7, the back gauge moves at a predetermined slow speed responsive to maintenance of separation of contacts 55 and for the equivalent distance corresponding to the distance D of FIGURE 2, until each signal in turn passes the stop head 8. Thus, when signal X reaches stop head 8 and is detected, the solenoid 67 is actuated driving plunger 64 against pawl lever 61 and effecting counterclockwise rotation, as seen in FIGURE 5 by the arrow, to turn gear 12 in a direction opposite to that in which gear 15 was turned. Accordingly, such rotation of gear 12 moves the planetary pinion 27 downwardly, as viewed in FIGURE 3, and thus rocks the cam 42 counterclockwise as viewed in FIGURE 4, which permits the contacts 55 to approach each other for the same distance that they moved apart from each other when the signal X was detected by the slow head 10. In effect, the storing of signal X in the computer adding unit has been cancelled or subtracted by the computer subtracting unit. However, due to novel provision of the control circuitry hereinafter explained, the signals Y and Z being, very close after signal X and to each other, would not effect a subtraction of the respective additions which they previously stored. Such subtraction is taken care of in another manner dependent upon the back gauge having previously been in high speed and in response to operation of the knife which controls suitable circuitry to effect functioning of the subtraction unit. Thus, where long cuts are taken, the back gauge being controlled by signals which are spaced further apart from each other than the spacing D, there is direct control of subtraction upon operation of the knife when the back gauge is stopped. Further is high speed resumption of back gauge movement each time starter button 100 (FIGURE 7) is pressed, although a brief period of slow speed initial travel is provided in contemplation of the possibility that the very next signal on the tape is very close to the last signal, the last signal having effected stopping of the gauge and the very next signal being for a trim out cut. However, such degree of slow travel is much less than that which is necessitated in conventional machines by the distance D between heads.

To summate, each of the signals which are spaced further from each other than distance D effects in turn an actuation of the adding unit and of the subtracting unit when the back gauge stops and the knife operates; where signals are closer to each other than distance D, each signal effects operation of the adding unit but the circuitry controls operation of the subtraction unit in accordance with certain time delay relays provided, and thus functioning of the subtraction unit is not in response to operation of the knife under such circumstances.

Referring now to FIGURE 7, voltage lines V1 and V2 are provided between which are connected certain electronic components such as relays, switches, etc., which will be identified in the course of explaining operation of the circuit, detailed description of specific connections being unnecessary since this is obvious from the schematic diagram. It will be understood, however, that the knife actuated switches which form part of the circuit are conventional elements in control circuitry of machines of this kind and the cams which operate them are not disclosed herein since such mechanical elements are well known and may either be carried by the knife suspension system, or mounted on the crank arms which actuate the knife, all methods heretofore used in practice.

When it is desired to move the back gauge forwardly, push button switch 100 is pressed manually or mechanically, thus energizing relay coil CR2 which locks in the relay through contact CR 2–1. The contact CR2–2 is likewise closed to energize the low speed clutch solenoid 105, and also a time delay relay coil CR5. The back gauge is therefore moving in slow speed at this time. However, when the time delay of relay CR5 has expired, the contact CR5–1 is closed to energize the coil of relay CR4. It will be noted that the contacts 55 are closed at this time since no slow signal has been picked up and stored by the adding unit of the computer. The energizing of relay CR4 opens its contact CR4–1 which is normally closed and closes its contact CR4–2 which is normally open. This energizes the solenoid 110 of the high speed clutch which causes the back gauge to move at high speed. It will be understood that the high and low speed clutches are conventional in machines of this type and are suitably connected intermediate high and low speed motors, to the mechanism which reciprocates the back gauge.

Assuming now that the tape is moving in the direction shown (FIGURES 1 and 2), when the X signal reaches the slow pick up head 10, the signal is passed thereby to an amplifier 115 in a conventional manner, the output of which energizes the coil of relay TR2 to open contact TR2–1, thereby de-energizing relay CR4 and throwing the back gauge back into low speed. Simultaneously, contact TR2–2 energizes the solenoid 82 to store the slow signal in the computer via the adding unit, and opening, as explained hereinabove, contacts 55, which interruption maintains relay CR4 de-energized. It will be noted that such de-energization of CR4 is retained even though relay TR2 is subsequently de-energized, since CR4 has an interrupted circuit via contacts 55. Relay CR5 has a contact CR5–2 which, upon closure, that is upon energization of CR5, energizes a relay CR24 causing it to close its interlocking contact CR24–1. The back gauge now moving in slow speed reaches a position such that signal X reaches the stop head 8 which senses the signal and after amplification through the amplifier 115, energizes the coil of relay TR1 which has a contact TR1–1 that is opened to de-energize the coil of relay CR2. Thus, contact CR2–2 opens the circuit of the low speed clutch 105, both clutches for that matter, and the back gauge stops moving, the paper then being ready for cutting. As the knife is operating in the cutting stroke under control of conventional circuitry (not shown), a cam switch 120 (cam not shown) operated by the movement of the knife closes the circuit for energization of solenoid 67 and thus effects counter planetary rotation of planetary gear 27 by virtue of rotation of gear 12, as effected by the subtracting unit. Accordingly, as has been explained hereinabove, the planetary gear is brought back to neutral position by subtraction of one notch or step, formerly stored via the adding unit, spring 40 serving to center shaft 30 once again and contacts 55 thus being closed. The same cam actuated by the knife (not shown) effects opening of switch 120 and immediately thereafter another cam (not shown) actuated by the knife opens the circuit of relay CR24 at the switch 125. Accordingly, it will be seen that before the subtracting unit solenoid 67 can be energized, the back gauge must have been in high speed due to open relay contact CR5–2, which is operated by the time delay relay CR5. In other words, as long as the back gauge is moving slowly under the influence of time delay relay CR5, no subtraction in the computer can take place even though the knife has been operated. This is compensated for in order to resume high speed operation by a relay CR25 as explained hereinafter.

Certain safeguard is provided to take care of instances where the back gauge is moving at high speed but the distance between signals such as X and Y is very small. Under such circumstances there may be insufficient time to obtain full actuation of adding solenoid 82 for each of the signals. Thus, only one signal may be registered. Accordingly, the time delay of relay CR5 is such as to maintain the gauge (and thus the tape) in slow speed, for a distance slightly greater than any minimum distance between two signals such as X and Y in order to ensure adding a notch.

Thus, the relay CR5 keeps the subtracting mechanism de-energized to make certain that, as explained above, upon a cut being taken, no subtracting takes place when no corresponding addition had not previously taken place. Since there is an overlapping of time during which the back gauge is in slow speed, whether or not a signal is added to the computer, it is possible that the computer might retain an unsubtracted notch which would maintain slow speed of the back gauge indefinitely. To make certain that such indefinite slow running does not take place in the event that the back gauge moves through a distance D corresponding to the distance D on the tape, time delay relay CR25 is provided for the purpose of energizing release solenoid 91 and thus to actuate pawl levers 73 and 85, permitting ratchet wheel 70 under the influence of spring 40 acting on shaft 30, to return to starting or neutral position whereat shaft 30 abuts stop 36.

Thus, the delay time for relay CR5 is slightly longer than the time necessary to actuate the adding unit solenoid 82 so as to ensure that the back gauge will remain in slow speed until the particular signal in question reaches the stop head, even though it has not been added in the computer. However, should such signal be added, as noted above, it would not be subtracted while the back gauge was still under control of relay CR5; thus maintaining slow movement of the back gauge, a condition which is overcome by contact CR5–1 in effecting energization of time delay relay CR25. The effect of relay CR25 is to close its contact CR25–1 for energization of release solenoid 91 thereby removing all detents on wheel 70, as explained above. The operation of relay CR25 actually takes place only when there are very small trim out cuts; that is, very small distances between signals on the tape.

A further safeguard is provided by way of relay TR1 which is de-energized upon opening of normally closed contact CR4–3. Such de-energization of relay TR1 opens contact TR1–1 making it impossible for the back gauge to stop unless it is in slow speed.

The circuit is completed by providing a stop speed 130 capable of stopping the back gauge at any time by push button actuation, by opening the circuit to CR2. The circuit also provides for a recording or marking switch 135. Thus, in the position shown, a condenser 138 is rendered ineffective by shunting at contacts 142. However, when it is desired to place a signal on the tape, switch 135 may be manually or automatically actuated to remove the condenser shunt while at the same time closing the contacts at 145 to send a pulse to the head 8, such pulse being a discharge of the condenser. Also, at this time contacts 148 open to prevent the pulse from going through the amplifier and thus controlling the back gauge in any way.

Having thus described my invention I am aware that various changes may be made without departing from the spirit thereof, and accordingly I do not seek to be limited to the precise illustrations herein given except as set forth in the appended claims.

The embodiments of the invention in which an exclusive privilege or property is claimed are defined as follows:

1. In a system of the class described for predetermining the speed of a moving machine part, a signal record member and a pair of signal sensing elements for detecting signals on said record member, computer means coupled to said sensing elements for sequentially storing signals sensed by one of said sensing elements and sequentially cancelling the storage of signals in the same order as stored upon sensing by said other sensing element, and control means for effecting a predetermined speed of said machine part when an uncancelled signal is stored in said computer means, wherein the same signal is detected by said sensing elements and initially stored and subsequently cancelled, means for moving said record member in synchronization with said machine part.

2. In a system as set forth in claim 1, said computer means comprising a differential gear device having a planetary gear, said control means having a contact device for interrupting current upon actuation of said planetary gear in a given direction, responsive to sensing of a signal by said one sensing element.

3. In a system as set forth in claim 2, wherein said control means is operative to effect closure of said contact device upon sensing of a signal by said other sensing element.

4. In a system of the class described, a signal record device and a pair of spaced signal sensing elements for detecting spaced signals on said record device, computer means coupled to said sensing elements for sequentially storing signals detected by one of said sensing elements and sequentially cancelling the storage of signals in the same order as stored when said signals are detected by the other of said sensing elements, and means for effecting a predetermined speed of a machine part when any uncancelled signal is stored in said computer means, means for moving said record member in synchronization with said machine part.

5. In a system for predetermining the speed of a moving machine part, a record device on which signals may be placed, a pair of sensing elements for detecting said signals, a computer means comprising a pair of coaxial pinions and a planetary gear therebetween wherein rotation of either gear can effect planetary motion in a respective direction of said planetary gear to and from a neutral position, means coupling one of said sensing elements to a respective pinion for effecting respective directional rotation step-by-step thereof in response to detection of signals by said sensing element, including circuitry means controlled by rotation of said planetary gear for effecting a predetermined speed of said machine part when said planetary gear is rotated from neutral position and means coupling said other sensing element to the other of said pinions and being operative to effect reverse rotation of said planetary gear back to said neutral position responsive to signals being detected by said other sensing element, means for moving said record member in synchronization with said machine part.

6. In a system for predetermining the speed of a moving machine part, a record member on which signals may be placed, a pair of sensing elements for detecting said signals, a computer means comprising a pair of coaxial pinion gears and a planetary gear therebetween wherein rotation of either gear can effect planetary motion of said planetary gear in a respective direction, coupling means for coupling one sensing element to a respective pinion gear for effecting rotation thereof in response to detection of a signal by said sensing element to effect planetary rotation of said planetary gear in one direction from a neutral position including control means responsive to said rotation of said planetary gear from said neutral position for effecting a predetermined speed of said machine part, and retaining means for maintaining said planetary gear in rotated position with respect to said neutral position wherein said predetermined speed is maintained for as long as said planetary gear is in such position, and coupling means for coupling said other sensing element to the other of said pinion gears operative to effect reverse rotation of said planetary gear back to said neutral position responsive to signals being detected by said other sensing element, means for moving said record member in synchronization with said machine part.

7. In a system of the class described for predetermining the speed of a moving machine part, a signal record member and a pair of signal sensing elements for detecting signals on said record member, computer means coupled to said sensing elements for sequentially storing signals detected by one of said elements and sequentially cancelling the storage of signals in the same order as stored upon sensing by said other sensing element and control means for effecting a predetermined speed of said machine part when an uncancelled signal is stored in said computer means, wherein the same signal is detected by said sensing elements and initially stored and subsequently cancelled by said sensing elements, said control means having elements operative to effect stopping of said machine part when a signal is cancelled, means for moving said record member in synchronization with said machine part.

8. In a system for predetermining the speed of a moving machine part, the combination which comprises a recording medium having a pair of sensing elements for sensing signals thereon, circuitry means having elements operative to effect fast and slow speeds of said machine part, computer means coupled to said sensing elements for initially storing and subsequent cancelling of signal senses, said computer means being coupled to said circuitry means and being operative to control said circuitry means for effecting a predetermined speed of said machine part dependent on the existence of a signal stored in said computer means, said circuitry means having control elements for compensating for inability of said computer means to store closely spaced signals wherein said machine part is maintained at slow speed independently of storage of a signal in said computer means, means for moving said record member in synchronization with said machine part.

9. In a device as set forth in claim 8, said circuitry means having additional control elements to render said last-named control means ineffective after a predetermined slow speed movement of said machine part.

10. In a system as set forth in claim 8, said control elements comprising a time delay relay.

11. In a system as set forth in claim 10, said second control elements comprising a time delay relay.

12. In a system for predetermining the speed of a moving machine part, a record member on which signals may be placed, a pair of sensing elements for detecting said signals, a computer means comprising a pair of coaxial pinion gears and a planetary gear therebetween wherein rotation of either gear can effect planetary motion of said planetary gear in a respective direction, coupling means for coupling one sensing element to a respective pinion gear for effecting rotation thereof in response to detection of a signal by said sensing element to effect planetary rotation of said planetary gear in one direction from a neutral position, including control means responsive to said rotation of said planetary gear from said neutral position for effecting a predetermined speed of said machine part, and retaining means for maintaining said planetary gear in rotated position with respect to said neutral position wherein said predetermined speed is maintained for as long as said planetary gear is in such position, and coupling means for coupling said other sensing element to the other of said pinion gears operative to effect reverse rotation of said planetary gear back to said neutral position responsive to signals being detected by said other sensing element, said control means comprising a shaft on which said planetary gear is supported, said shaft being rockable about the axis of said pinion gears and cam means connected to said shaft whereupon rocking thereof effects actuation of said cam means, and contact means coupled to said cam means and effecting closure when said planetary gear is in neutral position and effecting opening when said planetary gear is in other than neutral position, means for moving said record member in synchronization with said machine part.

13. In a system as set forth in claim 12, said control means also comprising an electrical circuit having elements operative in response to opening of said contact means to effect a slow speed of said machine part and to effect stopping of said machine part when a signal reaches said other sensing element, said control means having further control elements operative to effect resumption of motion of said machine part at high speed subsequent to stopping thereof.

14. In a speed control system for a moving machine part, a pair of spaced signal sensing elements responsive to signals on a relatively moving recording member, means for moving said record member in synchronization with said machine part, a first means for storage of a signal detected by one of said sensing elements, a second means for cancelling the storage of said signal upon subsequent detection of the same signal by said other sensing element, control circuitry means connected to said first means for controlling the speed of a machine part dependent upon existence of a stored signal in said first means, said control circuitry means having elements operative to effect stopping of said machine part responsive to a signal reaching said other sensing element, said control circuitry means also having control elements responsive to movement of another part of said machine to effect operation of said storage cancelling means when said first mentioned machine part has stopped.

15. In a speed control system as set forth in claim 14, said control means having additional control elements to nullify response to said last mentioned control means when said first mentioned machine part has previously been moving at greater than a predetermined speed prior to stopping.

16. In a system as set forth in claim 15, said control means having further control elements to effect initial starting of said first mentioned machine part at said predetermined speed after stopping.

References Cited by the Examiner

UNITED STATES PATENTS

| | | | |
|---|---|---|---|
| 2,860,705 | 11/1958 | Thumim | 307—149 |
| 2,992,578 | 7/1961 | Hribar | 83—207 |
| 3,118,334 | 1/1964 | Blaha | 83—71 |

LLOYD McCOLLUM, *Primary Examiner.*